US010872250B2

(12) United States Patent
Gibbs et al.

(10) Patent No.: US 10,872,250 B2
(45) Date of Patent: Dec. 22, 2020

(54) VEHICLE PARKING ENFORCEMENT SYSTEM

(71) Applicant: Meter Feeder, Inc., Pittsburgh, PA (US)

(72) Inventors: James Gibbs, Pittsburgh, PA (US); Daniel W. Lopretto, Pittsburgh, PA (US)

(73) Assignee: Meter Feeder, Pittsburgh, PA (US)

( * ) Notice: Subject to any disclaimer, the term of this patent is extended or adjusted under 35 U.S.C. 154(b) by 152 days.

(21) Appl. No.: 15/982,338

(22) Filed: May 17, 2018

(65) Prior Publication Data
US 2018/0336427 A1 Nov. 22, 2018

Related U.S. Application Data

(60) Provisional application No. 62/507,950, filed on May 18, 2017.

(51) Int. Cl.
G06K 9/00 (2006.01)
G08G 1/14 (2006.01)
G08G 1/017 (2006.01)
G05D 1/00 (2006.01)
G06K 9/32 (2006.01)
(Continued)

(52) U.S. Cl.
CPC ....... *G06K 9/00825* (2013.01); *G05D 1/0088* (2013.01); *G06K 9/00812* (2013.01); *G06K 9/3258* (2013.01); *G07B 15/02* (2013.01); *G08G 1/0175* (2013.01); *G08G 1/146* (2013.01); *G01C 21/3602* (2013.01); *G01C 21/3685* (2013.01); *G06K 2209/15* (2013.01)

(58) Field of Classification Search
CPC .......... G06K 9/00825; G06K 9/00812; G06K 9/3258; G05D 1/0088
See application file for complete search history.

(56) References Cited

U.S. PATENT DOCUMENTS 5,170,352 A 12/1992 McTamaney et al.
5,229,941 A 7/1993 Hattori
(Continued)

OTHER PUBLICATIONS

Tamrazian, A. et al., "Where is my parking spot? On-line and off-line prediction of time-varying parking occupancy" 2015.
(Continued)

*Primary Examiner* — Kim Y Vu
*Assistant Examiner* — Molly Delaney
(74) *Attorney, Agent, or Firm* — Curtis Wadsworth

(57) ABSTRACT

A parking enforcement system includes an autonomous vehicle that is equipped with an image capture device that is configured to capture images of license plates of parked vehicles while the autonomous vehicle moves through a parking zone. The system will process the images to extract license plate numbers from the images. The system will correlate the license plate numbers with data in a parking enforcement database to determine whether the license plate numbers are associated with an unexpired parking transaction. For any license plate number that is not subject to an unexpired parking transaction, the system may initiate an enforcement action. For any license plate number that is subject to an unexpired parking transaction, the system may not initiate an enforcement action.

14 Claims, 3 Drawing Sheets

(51) Int. Cl.
*G07B 15/02* (2011.01)
*G01C 21/36* (2006.01)

(56) References Cited

U.S. PATENT DOCUMENTS

| | | | | |
|---|---|---|---|---|
| 6,081,206 | A * | 6/2000 | Kielland | G06Q 30/0284 |
| | | | | 194/902 |
| 6,151,539 | A | 11/2000 | Bergholz et al. | |
| 6,243,029 | B1 * | 6/2001 | Tomer | G07B 15/02 |
| | | | | 235/378 |
| 7,711,150 | B2 | 5/2010 | Simon | |
| 8,447,112 | B2 | 5/2013 | Paul et al. | |
| 9,075,415 | B2 | 7/2015 | Kugelmass | |
| 9,449,512 | B2 | 9/2016 | Zafiroglu et al. | |
| 9,494,439 | B1 | 11/2016 | Ross et al. | |
| 9,495,869 | B2 | 11/2016 | Bhogal et al. | |
| 9,508,260 | B2 | 11/2016 | Shaik | |
| 9,557,736 | B1 | 1/2017 | Silver et al. | |
| 9,567,007 | B2 | 2/2017 | Cudak et al. | |
| 9,773,413 | B1 * | 9/2017 | Li | G08G 1/144 |
| 10,311,731 | B1 * | 6/2019 | Li | G06K 9/00664 |
| 10,417,912 | B2 * | 9/2019 | Stefik | G08G 1/14 |
| 2012/0147190 | A1 * | 6/2012 | Ioli | G06Q 20/40 |
| | | | | 348/149 |
| 2012/0215383 | A1 * | 8/2012 | Yoon | H04N 7/18 |
| | | | | 701/2 |
| 2015/0138001 | A1 * | 5/2015 | Davies | G08G 1/149 |
| | | | | 340/932.2 |
| 2016/0078759 | A1 * | 3/2016 | Nerayoff | G06T 7/248 |
| | | | | 701/3 |
| 2016/0196747 | A1 | 7/2016 | Tsyrklevich | |

OTHER PUBLICATIONS

Information about Related Patents and Patent Applications, see section 6 of the accompanying Information Disclosure Statement Letter, which concerns Related Patent and Patent Applications.

* cited by examiner

VEHICLE PARKING ENFORCEMENT SYSTEM

RELATED APPLICATIONS AND CLAIM OF PRIORITY

This patent document claims priority to U.S. Provisional Patent Application No. 62/507,950, filed May 18, 2017. The disclosure of the priority application is fully incorporated into this application by reference.

BACKGROUND

Vehicle parking enforcement is a labor-intensive process. Parking enforcement officials must walk, ride or drive along a group of parked vehicles and visually inspect each vehicle or its corresponding parking meter to determine whether the vehicle's parking is paid-for, and whether any paid-up time remains for the vehicle.

Automated parking payment systems have improved the parking process for vehicle drivers. Today, drivers can pay for parking via mobile electronic device applications, or via kiosks in which the driver enters the vehicle's license plate number and pays for a block of time to park the vehicle in a particular parking zone. However, these systems have not yet eased the labor-intensive process of parking enforcement. To determine whether a particular parked vehicle is paid for, an enforcement officer still must inspect the vehicle's license plate and compare it to a list of plate numbers for vehicles who are subject to active parking time blocks in a particular parking zone.

This document describes methods and systems that are designed to improve the parking enforcement process.

SUMMARY

In various embodiments, a parking enforcement system includes an autonomous vehicle that is equipped with an image capture device that is configured to capture images of license plates of parked vehicles while the autonomous vehicle moves through a parking zone. The system will process the images to extract license plate numbers from the images. The system will correlate the license plate numbers with data in a parking enforcement database to determine whether the license plate numbers are associated with an unexpired parking transaction. For any license plate number that is not subject to an unexpired parking transaction, the system may initiate an enforcement action. For any license plate number that is subject to an unexpired parking transaction, the system may not initiate an enforcement action.

In some embodiments, to process the images and extract license plate numbers from the images, the system may implement an automated number plate recognition process that uses license plate localization, character segmentation, and optical character recognition. The processor and programming instructions for performing the image processing may be components of the autonomous vehicle, of a remote server that is in wireless electronic communication with the autonomous vehicle via a transceiver, or multiple parts that are components of both the vehicle and a remote server.

In some embodiments, the image capture device may be mounted on a front section of the autonomous vehicle and positioned to capture images of license plates on parked vehicles that are in front of the autonomous vehicle at an angle that is between 45 and 85 degrees with respect to an axis of travel of the autonomous vehicle. In other embodiments, the image capture device may be mounted on a rear section of the autonomous vehicle and positioned to capture images of license plates on parked vehicles that are behind the autonomous vehicle at an angle that is between 45 and 85 degrees with respect to an axis of travel of the autonomous vehicle. In other embodiments, the image capture device may be mounted on a side of the autonomous vehicle and positioned to capture images of license plates on parked vehicles that are beside the autonomous vehicle at an angle that is between 80 and 110 degrees with respect to an axis of travel of the autonomous vehicle.

In some embodiments, the enforcement route may include a route that is to the left of the parked vehicles. The image capture device may be positioned to capture images of license plates of the parked vehicles that are to the right of the autonomous vehicle. The vehicle may be programmed to only stop, move straight and turn right when the autonomous vehicle is in the parking zone unless the autonomous vehicle encounters an obstacle that requires a different direction of movement.

In other embodiments, the enforcement route may include the enforcement route comprises a route that is to the right of the parked vehicles. The image capture device may be positioned to capture images of license plates of the parked vehicles that are to the left of the autonomous vehicle. The vehicle may be programmed to only stop, move straight and turn left when the autonomous vehicle is in the parking zone unless the autonomous vehicle encounters an obstacle that requires a different direction of movement.

In some embodiments, to initiate an enforcement action for each extracted license plate number that is not subject to an unexpired parking transaction, the system may determine whether the parking enforcement database includes a payment credential that is associated with the license plate number. If the parking enforcement database includes a payment credential that is associated with the license plate number, the use the payment credential to implement a parking purchase transaction. If the parking enforcement database does not include a payment credential that is associated with the license plate number, generate an enforcement ticket and cause the enforcement ticket to be transmitted to an enforcement agent or an owner of the vehicle on which the license plate number is installed.

In some embodiments, the system also may determine an estimated density of parked vehicles in the parking zone, and the system also may determine an expected density for the parking zone at a current time. If the estimated density is greater than the expected density, the system may increase a speed of the autonomous vehicle while traveling in the parking zone, and/or the system may reduce a number of images that the image capture device will capture in the parking zone. If the estimated density is less than the expected density, the system may decrease a speed of the autonomous vehicle while traveling in the parking zone, and/or the system may increase a number of images that the image capture device will capture in the parking zone.

DETAILED DESCRIPTION

Figure 1:
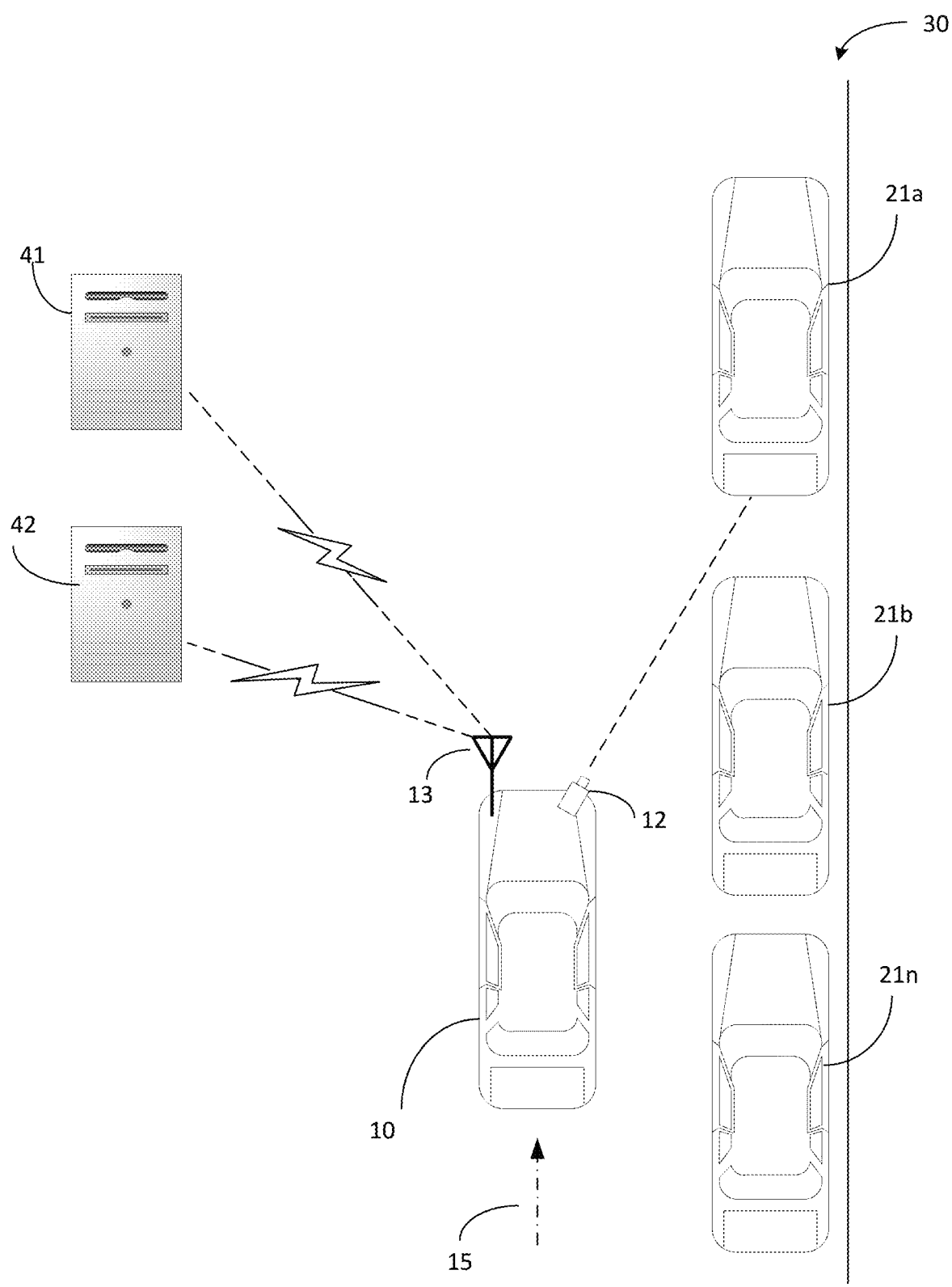
FIG. 1 illustrates various elements of a system for parking enforcement.

In this document: (i) the term "comprising" means "including, but not limited to"; the singular forms "a," "an,"

and "the" include plural references unless the context clearly dictates otherwise; and (iii) unless defined otherwise, all technical and scientific terms used in this document have the same meanings as commonly understood by one of ordinary skill in the art.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. The server may be a single device or a collection of devices that are distributed but via which share processing devices and/or memory are shared. In a virtual machine arrangement, a server may be an electronic device, and each virtual machine or container may also be considered to be an electronic device. In the discussion below, a client device, server device, virtual machine or container may be referred to simply as a "device" for brevity.

An "image capture device" is a device having one or more imaging sensors that are capable of optically viewing an object and converting an interpretation of that object into electronic signals. One such example of an imaging device is a camera. Examples of image capture devices used in this document may include license plate recognition cameras such as those now or hereafter commercially available.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the term "parking zone" means a physical space that is designated for vehicle parking. Vehicle operators may initiate parking purchase transactions in which they purchase authorization to park their vehicles in the parking zone for a designated period of time.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

A "vehicle" is a machine that is configured to transport one or more passengers and/or cargo from one location to another. Examples of vehicles include automobiles, trucks, vans, motorcycles, aircraft, watercraft, drones and the like. An "autonomous vehicle" is a land-based, airborne or water-based vehicle that includes a robotic transport system, a processor, and programming instructions that are configured to enable the processor to command the robotic transport system to move the vehicle through an environment without human steering or other direction. Semi-autonomous vehicles, such as those that provide for human override, or human operation in certain situations are included within the definition of "autonomous vehicles." The transport system may be a motor and set of wheels and/or rollers (in case of a land-based vehicle), or propellers and/or propulsion systems (in case of an unmanned aerial vehicle). Examples of autonomous vehicles are disclosed U.S. Pat. Nos. 6,151,539; 5,170,352; 5,229,941; and 9,075,415, the disclosures of which are fully incorporated into this document by reference.

When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

FIG. 1 illustrates an example of a parking enforcement system in which an autonomous vehicle 10 serves as a parking enforcement vehicle. The autonomous vehicle 10 includes a transport system (such as wheels, an engine or motor, and a drivetrain), a processor, an image capture device 12, a transceiver 13, and programming instructions stored on a computer-readable medium. The autonomous vehicle 10 may be an automobile as shown, or it may be any mobile vehicle such as a truck, cart, scooter, unmanned aerial vehicle (UAV) or other mobile robotic device. The transport system will be a motor and set of wheels and/or rollers (in case of a land-based vehicle), or propellers and/or propulsion systems (in case of a UAV). Examples of autonomous vehicles are disclosed U.S. Pat. Nos. 6,151,539; 5,170,352; 5,229,941; and 9,075,415, the disclosures of which are fully incorporated into this document by reference.

The autonomous vehicle 10 will include a computer-readable medium with programming instructions that, when executed by a processor of the autonomous vehicle 10, are configured to cause the autonomous vehicle's transport system to move the autonomous vehicle along a route that includes one or more parking zones 30. Any number of vehicles 21a . . . 21n will be parked in each parking zone. Each parked vehicle will include a license plate that displays a license plate number. (As used in this document, the term "license plate number" will be used to refer to a set of alphanumeric characters and/or other symbols that are displayed on a vehicle's government-issued license plate.)

The autonomous vehicle's image capture device 12 may be positioned in a front area of the autonomous vehicle 10 as shown and positioned to capture images of license plates that are in front of the autonomous vehicle at an angle that is between 45 and 85 degrees with respect to an axis of travel 15 of the autonomous vehicle 10. In this way, as the autonomous vehicle travels along a street or other parking area the image capture device 12 may capture images of license plates that are positioned on the rear of one or more parked vehicles 21a . . . 21n that are in a parking position that is parallel to the direction of travel on a street and/or the curb alongside the street (i.e., a parallel parking position).

Alternatively or in addition, an image capture device 12 may be positioned in a rear section of the autonomous vehicle 10 and positioned to capture images of license plates that are behind the autonomous vehicle at an angle that is between 45 and 85 degrees with respect to an axis of travel 15 of the autonomous vehicle 10. In this way, the image capture device 12 may capture images of license plates that are positioned on the front of a set of parallel parked vehicles 21a . . . 21n. Alternatively or in addition, an image capture device 12 may be positioned on a left or right side the autonomous vehicle 10 and positioned to capture images of license plates that are beside the autonomous vehicle 10 at an angle that is between 80 and 110 degrees with respect to an axis of travel 15 of the autonomous vehicle 10. In this way, the image capture device 12 may capture images of license plates that are positioned on the rear or front of a set of parked vehicles in a parking lot, parking garage or other parking area through which the autonomous vehicle 10 is traveling. In such a situation, the parked vehicles may be positioned in a direction that is perpendicular to the direction of travel of the autonomous vehicle 10.

The system will include one or more servers 41, 42 that are in communication with the autonomous vehicle via a transceiver 13 and a wireless communication network. At least one of the servers 41 will include a parking enforcement database that includes a data set of vehicle license plate numbers and corresponding parking transactions. Each parking transaction will include a vehicle license plate number, a parking zone identifier and an expiration time. At least one of the servers 42 also may include a set of image processing instructions that are configured to process captured images and extract license plate numbers from the images. The parking enforcement database 41 and the image processing server 42 may be separate devices as shown. Alternatively, the parking enforcement database 41 and the image processing server 42 may be part of a single server, or they may be on separate servers. In addition, either or both of the parking enforcement database 41 and the image processing server 42 may be components of the autonomous vehicle 10.

The autonomous vehicle also may include other components, such as a global positioning system (GPS) receiver that is configured to receive location data from a GPS system.

Figure 2:
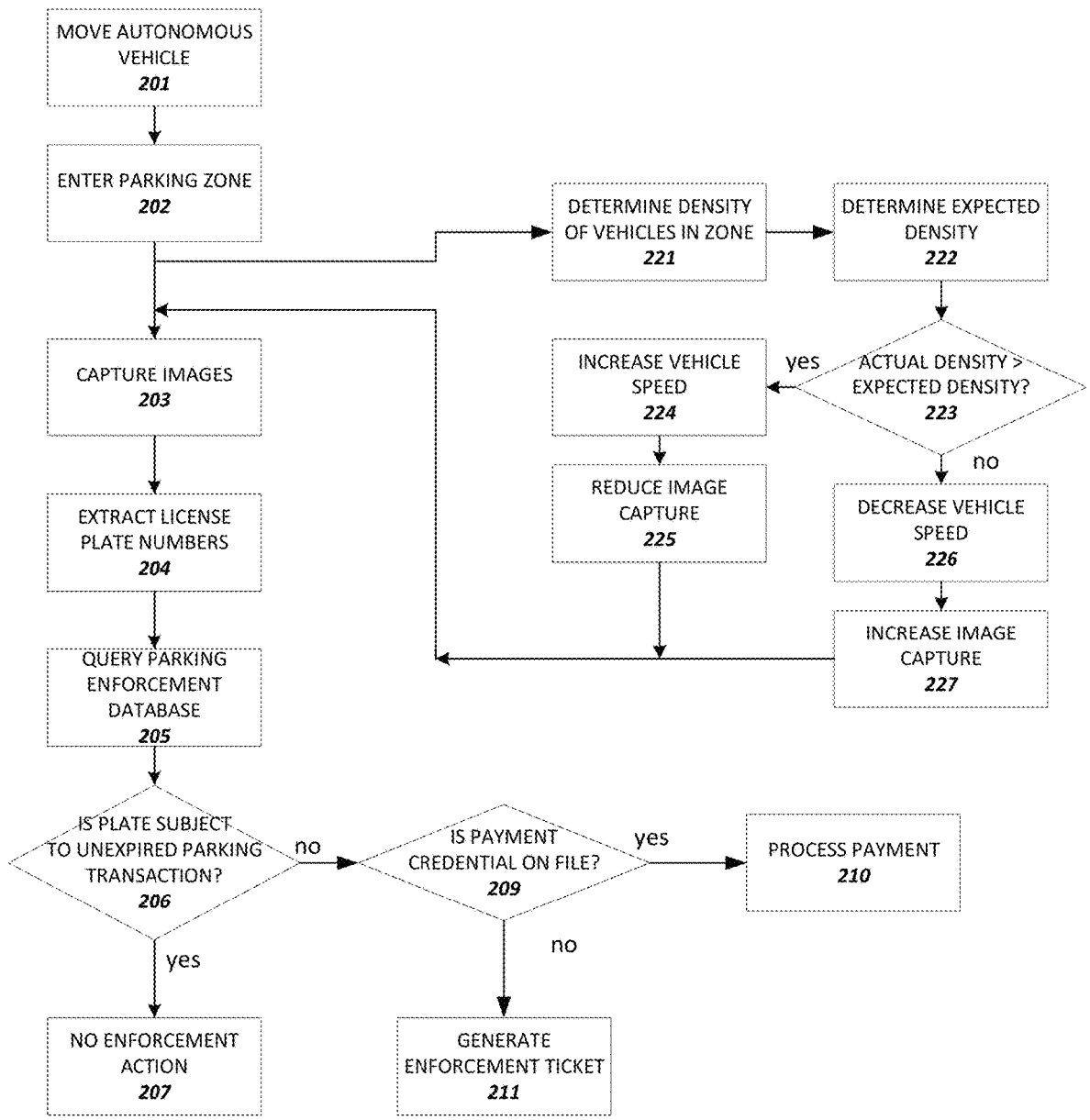
FIG. 2 is a flowchart illustrating various steps that a parking enforcement system may implement.

FIG. 2 illustrates a process that the parking enforcement system may implement. The autonomous vehicle may move along an enforcement route (step 201). The enforcement route will include a parking zone in which vehicles are authorized to park subject to time-limited payment terms (i.e., the vehicles may purchase increments of time to park in the zone, and any purchase transaction will include an expiration time). The autonomous vehicle may detect that it enters a parking zone (step 202) based on image processing and recognition, GPS data, or other methods. Upon entering the parking zone, the vehicle's image capture device will capture images of license plates of parked vehicles in the parking zone (step 203).

Optionally, if the enforcement route is to the left of the parked vehicles (as shown in FIG. 1), the image capture device may be positioned to capture images of license plates of parked vehicles that are to the right of the autonomous vehicle. If so, then the autonomous vehicle may only stop, move straight and turn right when the autonomous vehicle is in the parking zone unless the autonomous vehicle encounters an obstacle that requires a different direction of movement. Alternatively, the image capture device may be positioned to capture images of license plates of parked vehicles that are to the left of the autonomous vehicle. If so, then the autonomous vehicle may only stop, move straight and turn left when the autonomous vehicle is in the parking zone unless the autonomous vehicle encounters an obstacle that requires a different direction of movement.

The system will then process the images of license plates and extract a set of license plate numbers from the images (step 204). The system may do this using any suitable automated number plate recognition (ANPR) process. For example, the system may perform: (i) plate localization (i.e., detect a license plate in the image and isolate the license plate from other features in the image); (ii) plate orientation and sizing (to compensate for skew of the plate and adjust the dimensions to a required size); (iii) normalization to adjust the brightness and contrast of the image; (iv) character segmentation to locate the individual characters on the plate; (v) optical character recognition to identify each character; and (v) syntactical/geometrical analysis to check the characters and their positions against jurisdiction-specific rules of the license plate's issuing authority. Other ANPR processes may be used, such as those disclosed in U.S. Pat. Nos. 8,447,112 and 7,711,150, the disclosures of which are fully incorporated into this document by reference.

For each extracted license plate number, the autonomous vehicle's processor or another component of the enforcement system will query a parking enforcement database (step 205) to determine whether the license plate number is subject to an unexpired parking transaction (step 206). The system may do this by correlating the extracted license plate number with license plate numbers that are associated with parking purchase transactions in the database. If the license plate number is in the database and associated with an unexpired parking transaction, the system will not initiate any enforcement action (step 207) because the vehicle's parking is paid for at the current time. If the license plate number cannot be found in the database, or if the license plate number is found in the database but not associated with an unexpired parking transaction at the time of image capture, the system will conclude that the license plate number is not subject to an unexpired parking transaction (i.e., the vehicle is in violation as it has not paid for parking in the parking zone at the current time), and it will initiate an enforcement action. Examples of enforcement actions include generating an enforcement ticket and causing the enforcement ticket to be transmitted to an enforcement agent or an owner of the vehicle on which the license plate number is installed (step 211).

If the system initiates an enforcement action because license plate number is not subject to an unexpired parking transaction, optionally the system may determine whether the parking enforcement database includes a payment credential that is associated with the license plate number (step 209). If the parking enforcement database includes a payment credential that is associated with the license plate number, the system use the payment credential to implement a parking purchase transaction 210, which may include payment for parking and optionally a fine or other surcharge. If the parking enforcement database does not include a payment credential that is associated with the license plate number, the system may generate an enforcement ticket (step 211) as described above.

Optionally, before capturing images of some or all of the license plates in a parking zone, the system may determine an estimated density of the vehicles that are parked in the parking zone (step 221). The system may do this by receiving the estimated density from an external source, or by capturing one or more images and processing the images to identify a number of vehicles that are detected in the image. The system also may also access the parking enforcement database to identify a number of active parking purchase transactions in the zone at the time and use that number as the estimated parking density (or as a factor of the parking density, such as the number of vehicles per unit area). Other methods of estimating parking density are disclosed in publications such as Tamrazian et al., "Where is My Parking Spot?", *Transportation Research Record: Journal of the Transportation Research Board*, vol. 2489 (2015). The system may then determine an expected density for the parking zone at the current time (step 222) and determine whether the estimated density is greater than the expected density (step 223). If the estimated density is greater than the expected density, the system will perform one or both of the following: (i) increase a speed of the autonomous vehicle while traveling in the parking zone (step 224); or (ii) reduce a number of images that the image capture device will capture in the parking zone (step 225). If the estimated density is less than the expected density, the system will perform one or both of the following: (i) decrease a speed of the autonomous vehicle while traveling in the parking zone (step 226); or (ii) increase a number of images that the image capture device will capture in the parking zone (step 227). This allows the system to move more quickly through densely parked areas, and process relatively less data at peak times, when parking is in high demand and drivers are less likely to park their cars without paying for parking.

Figure 3:
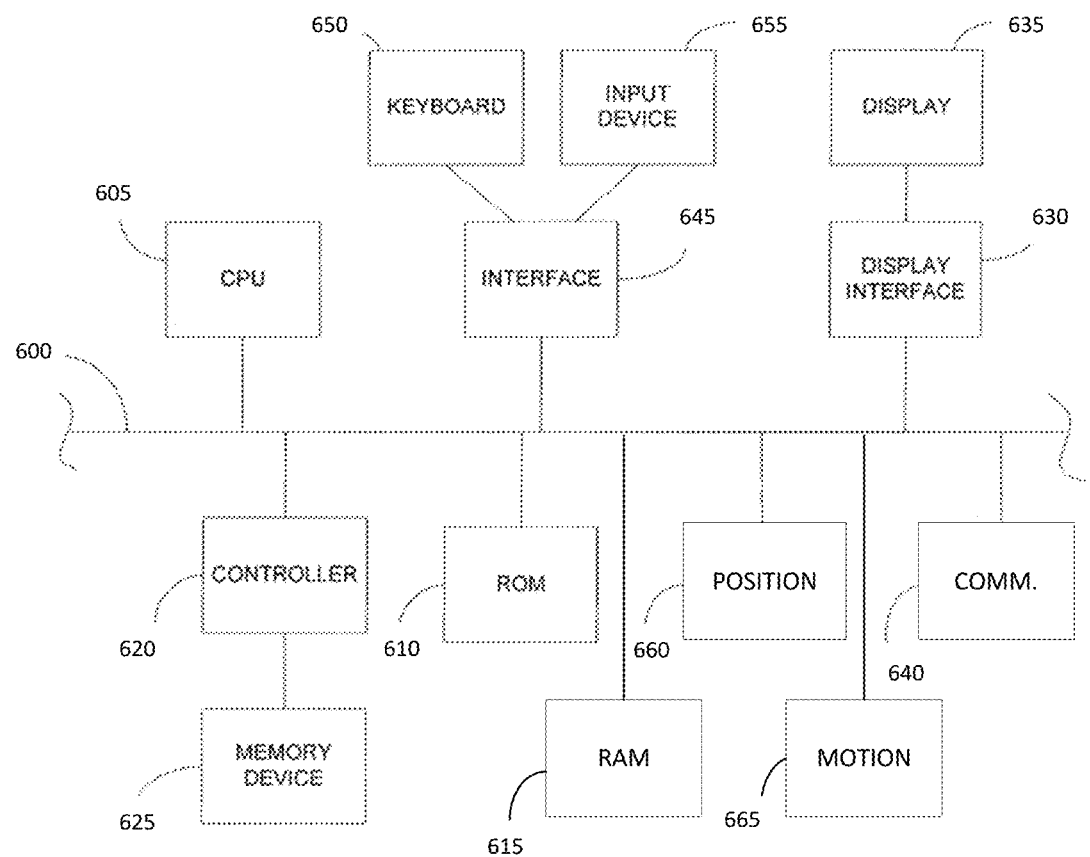
FIG. 3 illustrates example elements that may be included in an electronic device.

FIG. 3 depicts a block diagram of hardware that may be used to contain or implement program instructions, such as those of any of the cloud-based servers or autonomous vehicle described above. A bus 600 serves as an information highway interconnecting the other illustrated components of the hardware. Processor (CPU) 605 is a central processing device of the system, performing calculations and logic operations required to execute a program. CPU 605, alone or in conjunction with one or more of the other elements disclosed in FIG. 3, is an example of a processing device, computing device or processor as such terms are used within this disclosure. The processing device may be a physical processing device, a virtual device contained within another processing device, or a container included within a processing device. Read only memory (ROM) 610 and random access memory (RAM) 615 constitute examples of memory devices.

A controller 620 interfaces with one or more optional non-transitory computer-readable storage media (i.e., memory device 625) to the bus 600. These storage media may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on the storage media 625 discussed above. The programming instructions for various steps of the processes described above and in the claims may be stored in a memory of the autonomous vehicle, on a memory of one or more remote servers that are in electronic communication with the autonomous vehicle, or distributed across memory devices of the autonomous vehicle and one or more remote servers.

An optional display interface 630 may permit information from the bus 600 to be displayed on the display 635 in audio, visual, graphic or alphanumeric format. Communication with external devices, such as a printing device, may occur using various communication elements 640, such as a communication port or antenna. A communication element 640 may be communicatively connected to a communication network, such as the Internet or an intranet.

The hardware may also include an interface 645 which allows for receipt of data from input devices such as a keyboard 650 or other input device 655 such as a mouse, a touch pad, a touch screen, a remote control, a pointing device, a video input device and/or an audio input device. A positional sensor 660 and/or motion sensor 665 may be included to detect position and movement of the device. Examples of motion sensors 665 include gyroscopes or accelerometers. Examples of positional sensors 660 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A parking enforcement system, comprising:
an autonomous vehicle comprising:
a transport system,
a processor, and
an image capture device; and
a first set of programming instructions stored on a computer-readable medium, wherein the first set of programming instructions is configured to cause the processor of the autonomous vehicle to:
cause the transport system to move the autonomous vehicle along an enforcement route, wherein the enforcement route comprises a parking zone in which vehicles are authorized to park subject to time-limited payment terms, and
upon entering the parking zone, cause the image capture device to capture images, wherein the images comprise images of license plates of parked vehicles in the parking zone; and
determine an estimated density of parked vehicles in the parking zone;
determine an expected density for the parking zone at a current time;
if the estimated density is greater than the expected density, perform one or both of the following:
increase a speed of the autonomous vehicle while traveling in the parking zone, or
reduce a number of images that the image capture device will capture in the parking zone; and
if the estimated density is less than the expected density, perform one or both of the following:
decrease a speed of the autonomous vehicle while traveling in the parking zone, or
increase a number of images that the image capture device will capture in the parking zone; and
a second set of programming instructions stored on a computer-readable medium, wherein the second set of programming instructions is configured to cause a processor to process the images of license plates and extract, from each image, a license plate number; and
a third set of programming instructions stored on a computer-readable medium, wherein the third set of programming instructions is configured to cause a processor to:

for each extracted license plate number, query a parking enforcement database to determine whether the license plate number is subject to an unexpired parking transaction, take no enforcement action for each extracted license plate number that is subject to an unexpired parking transaction, and initiate an enforcement action for each extracted license plate number that is not subject to an unexpired parking transaction.

2. The parking enforcement system of claim 1, wherein:

the second set of programming instructions comprise instructions configured to implement an automated number plate recognition process that uses:

license plate localization, character segmentation, and optical character recognition; and the computer-readable medium that stores the second set of programming instructions and the processor that implements the second set of programming instructions are components of:

the autonomous vehicle, or a remote server that is in wireless electronic communication with the autonomous vehicle via a transceiver.

3. The parking enforcement system of claim 1, wherein the image capture device is mounted on:

a front section of the autonomous vehicle and positioned to capture images of license plates on parked vehicles that are in front of the autonomous vehicle at an angle that is between 45 and 85 degrees with respect to an axis of travel of the autonomous vehicle, or a rear section of the autonomous vehicle and positioned to capture images of license plates on parked vehicles that are behind the autonomous vehicle at an angle that is between 45 and 85 degrees with respect to an axis of travel of the autonomous vehicle.

4. The parking enforcement system of claim 1, wherein the image capture device is mounted on a side the autonomous vehicle and positioned to capture images of license plates on parked vehicles that are beside the autonomous vehicle at an angle that is between 80 and 110 degrees with respect to an axis of travel of the autonomous vehicle.

5. The parking enforcement system of claim 1, wherein:

the enforcement route comprises a route that is to the left of the parked vehicles;

the image capture device is positioned to capture images of license plates of the parked vehicles that are to the right of the autonomous vehicle; and the first set of programming instructions is configured to cause the processor of the autonomous vehicle to only stop, move straight and turn right when the autonomous vehicle is in the parking zone unless the autonomous vehicle encounters an obstacle that requires a different direction of movement.

6. The parking enforcement system of claim 1, wherein:

the enforcement route comprises a route that is to the right of the parked vehicles;

the image capture device is positioned to capture images of license plates of the parked vehicles that are to the left of the autonomous vehicle; and the first set of programming instructions is configured to cause the processor of the autonomous vehicle to only stop, move straight and turn left when the autonomous vehicle is in the parking zone unless the autonomous vehicle encounters an obstacle that requires a different direction of movement.

7. The parking enforcement system of claim 1, wherein the third set of programming instructions that are configured to cause the processor to initiate an enforcement action for each extracted license plate number that is not subject to an unexpired parking transaction comprise instructions to:

determine whether the parking enforcement database includes a payment credential that is associated with the license plate number;

if the parking enforcement database includes a payment credential that is associated with the license plate number, use the payment credential to implement a parking purchase transaction; and if the parking enforcement database does not include a payment credential that is associated with the license plate number, generate an enforcement ticket and cause the enforcement ticket to be transmitted to an enforcement agent or an owner of the vehicle on which the license plate number is installed.

8. A parking enforcement method, comprising:

by an autonomous vehicle having an image capture device:

traveling along an enforcement route, wherein the enforcement route comprises a parking zone in which vehicles are authorized to park subject to time-limited payment terms, and upon entering the parking zone, using the image capture device to capture images, wherein the images comprise images of license plates of parked vehicles in the parking zone; and by a processor:

determining an estimated density of parked vehicles in the parking zone;

determining an expected density for the parking zone at a current time;

if the estimated density is greater than the expected density, performing one or both of the following:

increasing a speed of the autonomous vehicle while traveling in the parking zone, or reducing a number of images that the image capture device will capture in the parking zone; and if the estimated density is less than the expected density, performing one or both of the following:

decreasing a speed of the autonomous vehicle while traveling in the parking zone, or increasing a number of images that the image capture device will capture in the parking zone; and by a processor:

processing the captured images and extracting, from at least some of the captured images, a license plate number, for each extracted license plate number, querying a parking enforcement database to determine whether the license plate number is subject to an unexpired parking transaction, taking no enforcement action for each extracted license plate number that is subject to an unexpired parking transaction, and initiating an enforcement action for each extracted license plate number that is not subject to an unexpired parking transaction.

9. The method of claim 8, wherein processing the captured images and extracting the license plate numbers comprises implementing an automated number plate recognition process that uses comprises:

license plate localization, character segmentation, and optical character recognition.

10. The method of claim 8, wherein:
the image capture device is mounted on a front section of the autonomous vehicle, and using the image capture device to capture images comprises capturing images of license plates on parked vehicles that are in front of the autonomous vehicle at an angle that is between 45 and 85 degrees with respect to an axis of travel of the autonomous vehicle, or
the image capture device is mounted on a rear section of the autonomous vehicle, and using the image capture device to capture images comprises capturing images of license plates on parked vehicles that are behind the autonomous vehicle at an angle that is between 45 and 85 degrees with respect to an axis of travel of the autonomous vehicle.

11. The method of claim 8, wherein:
the image capture device is mounted on a side the autonomous vehicle; and
using the image capture device to capture images comprises capturing images of license plates on parked vehicles that are beside the autonomous vehicle at an angle that is between 80 and 110 degrees with respect to an axis of travel of the autonomous vehicle.

12. The method of claim 8, wherein:
the enforcement route comprises a route that is to the left of the parked vehicles;
the image capture device is positioned to capture images of license plates of the parked vehicles that are to the right of the autonomous vehicle; and
the method further comprises, by the autonomous vehicle, only stopping, moving straight and turning right when the autonomous vehicle is in the parking zone unless the autonomous vehicle encounters an obstacle that requires a different direction of movement.

13. The method of claim 8, wherein:
the enforcement route comprises a route that is to the right of the parked vehicles;
the image capture device is positioned to capture images of license plates of the parked vehicles that are to the left of the autonomous vehicle; and
the method further comprises, by the autonomous vehicle, only stopping, moving straight and turning left when the autonomous vehicle is in the parking zone unless the autonomous vehicle encounters an obstacle that requires a different direction of movement.

14. The method of claim 8, wherein initiating an enforcement action for each extracted license plate number that is not subject to an unexpired parking transaction comprises:
determining whether the parking enforcement database includes a payment credential that is associated with the license plate number;
if the parking enforcement database includes a payment credential that is associated with the license plate number, using the payment credential to implement a parking purchase transaction; and
if the parking enforcement database does not include a payment credential that is associated with the license plate number, generating an enforcement ticket and causing the enforcement ticket to be transmitted to an enforcement agent or an owner of the vehicle on which the license plate number is installed.

\* \* \* \* \*